(12) United States Patent
Kupratis et al.

(10) Patent No.: US 10,584,642 B2
(45) Date of Patent: Mar. 10, 2020

(54) GEARED ARCHITECTURE WITH INDUCER FOR GAS TURBINE ENGINE

(71) Applicant: United Technologies Corporation, Farmington, CT (US)

(72) Inventors: Daniel Bernard Kupratis, Wallingford, CT (US); Frederick M. Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 64 days.

(21) Appl. No.: 16/027,693

(22) Filed: Jul. 5, 2018

(65) Prior Publication Data

US 2018/0363565 A1    Dec. 20, 2018

Related U.S. Application Data

(62) Division of application No. 13/437,395, filed on Apr. 2, 2012, now Pat. No. 10,018,119.

(51) Int. Cl.
*F02C 7/36* (2006.01)
*F02K 3/06* (2006.01)

(52) U.S. Cl.
CPC .............. *F02C 7/36* (2013.01); *F02K 3/06* (2013.01); *F05D 2260/40311* (2013.01)

(58) Field of Classification Search
CPC . F02K 3/06; F02K 3/072; F04D 19/02; F04D 19/024; F04D 19/026; F02C 3/06; F02C 3/067; F02C 7/36; F05D 2260/40311
See application file for complete search history.

(56) References Cited

U.S. PATENT DOCUMENTS

| | | | |
|---|---|---|---|
| 2,801,518 A | 8/1957 | Wosika et al. | |
| 3,287,906 A | 11/1966 | McCormick | |
| 4,005,575 A | 2/1977 | Scott et al. | |
| 4,251,987 A | 2/1981 | Adamson | |
| 5,010,729 A * | 4/1991 | Adamson | F02C 3/067 |
| | | | 416/129 |
| 5,274,999 A * | 1/1994 | Rohra | F02C 3/067 |
| | | | 60/226.1 |

(Continued)

FOREIGN PATENT DOCUMENTS

| | | |
|---|---|---|
| EP | 1777406 A2 | 4/2007 |
| EP | 2199568 | 6/2010 |

(Continued)

OTHER PUBLICATIONS

Conference on Engineering and Physics: Synergy for Success 2006. Journal of Physics: Conference Series vol. 105. London, UK. Oct. 5, 2006.

(Continued)

*Primary Examiner* — Richard A Edgar
*Assistant Examiner* — Joshua R Beebe
(74) *Attorney, Agent, or Firm* — Carlson, Gaskey & Olds, P.C.

(57) ABSTRACT

A gas turbine engine includes first and second shafts rotatable about a common axis. A first turbine section is supported on the first shaft. Second compressor and turbine sections are supported on the second shaft. The gas turbine engine includes a fan. A first compressor section is arranged in an axial flow relationship with the second compressor and the first and second turbines. A geared architecture operatively connects the first shaft and the fan. An inducer operative couples to the gear train.

20 Claims, 10 Drawing Sheets

(56) References Cited

U.S. PATENT DOCUMENTS

| | | | |
|---|---|---|---|
| 5,279,109 A | 1/1994 | Liu et al. | |
| 5,806,303 A * | 9/1998 | Johnson | F02K 1/30 60/226.1 |
| 5,915,917 A | 6/1999 | Eveker et al. | |
| 6,381,948 B1 * | 5/2002 | Klingels | F01D 25/16 416/129 |
| 6,895,741 B2 | 5/2005 | Rago et al. | |
| 6,901,739 B2 * | 6/2005 | Christopherson | F01D 17/105 60/226.3 |
| 7,513,103 B2 * | 4/2009 | Orlando | F01D 1/26 415/9 |
| 7,752,836 B2 * | 7/2010 | Orlando | F02C 3/067 60/268 |
| 7,788,898 B2 | 9/2010 | Kern et al. | |
| 7,841,165 B2 | 11/2010 | Orlando et al. | |
| 7,845,157 B2 | 12/2010 | Suciu et al. | |
| 7,883,315 B2 | 2/2011 | Suciu et al. | |
| 7,937,927 B2 | 5/2011 | Suciu et al. | |
| 7,959,406 B2 | 6/2011 | Suciu et al. | |
| 8,061,968 B2 | 11/2011 | Merry et al. | |
| 8,096,753 B2 | 1/2012 | Norris et al. | |
| 8,104,257 B2 | 1/2012 | Norris et al. | |
| 2005/0241291 A1 * | 11/2005 | Bart | F01D 17/162 60/226.1 |
| 2006/0059970 A1 | 3/2006 | Scott et al. | |
| 2006/0236675 A1 * | 10/2006 | Weiler | F02C 3/067 60/226.1 |
| 2007/0205321 A1 | 9/2007 | Waide | |
| 2008/0020891 A1 * | 1/2008 | Beaven | F01D 1/26 475/332 |
| 2008/0148707 A1 * | 6/2008 | Schilling | F02C 3/067 60/39.162 |
| 2009/0000265 A1 * | 1/2009 | Kupratis | F02C 3/064 60/39.15 |
| 2009/0074565 A1 * | 3/2009 | Suciu | F02C 3/113 415/122.1 |
| 2009/0090096 A1 | 4/2009 | Sheridan | |
| 2009/0145102 A1 * | 6/2009 | Roberge | F01D 1/023 60/39.162 |
| 2009/0148276 A1 | 6/2009 | Suciu et al. | |
| 2009/0169385 A1 | 7/2009 | Suciu et al. | |
| 2009/0288421 A1 | 11/2009 | Zeiner et al. | |
| 2009/0293445 A1 * | 12/2009 | Ress, Jr. | F02C 3/067 60/39.15 |
| 2010/0005778 A1 | 1/2010 | Chaudhry | |
| 2010/0126141 A1 * | 5/2010 | Schilling | F01D 1/26 60/268 |
| 2010/0148396 A1 | 6/2010 | Xie et al. | |
| 2010/0192595 A1 | 8/2010 | Orlando et al. | |
| 2010/0223904 A1 * | 9/2010 | Edwards | F02C 3/067 60/224 |
| 2010/0331139 A1 | 12/2010 | McCune | |

FOREIGN PATENT DOCUMENTS

| | | |
|---|---|---|
| GB | 579820 A | 8/1946 |
| GB | 891064 | 3/1962 |
| GB | 1097632 | 1/1968 |
| GB | 1516041 | 6/1978 |
| GB | 2041090 | 9/1980 |
| WO | 2006059981 | 6/2006 |
| WO | 2006059992 | 6/2006 |
| WO | 2007038674 | 4/2007 |
| WO | 2008082336 | 7/2008 |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K, Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

(56) References Cited

OTHER PUBLICATIONS

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

* cited by examiner

GEARED ARCHITECTURE WITH INDUCER FOR GAS TURBINE ENGINE

CROSS-REFERENCE TO RELATED APPLICATIONS

This application is a continuation of U.S. application Ser. No. 13/437,395, filed on Apr. 2, 2012.

BACKGROUND

This disclosure relates to a geared architecture for a gas turbine engine.

One type of geared turbofan engine includes a two-spool arrangement in which a low spool, which supports a low pressure turbine section, is coupled to a fan via a planetary gear train. A high pressure spool supports a high pressure turbine section. Low and high pressure compressor sections are respectively supported by the low and high spools.

The planetary gear train includes a planetary gear set surrounding and intermeshing with a centrally located sun gear that is connected to the low spool. A ring gear circumscribes and intermeshes with the planetary gears. A fan shaft supports the fan. The fan shaft is connected to either the planetary gears or the ring gear, and the other of the planetary gears and ring gear is grounded to the engine static structure. This type of planetary gear arrangement can limit the design speeds of and configuration of stages in the low and high pressure turbine sections.

SUMMARY

In one exemplary embodiment, a gas turbine engine includes first and second shafts rotatable about a common axis. A first turbine section is supported on the first shaft. Second compressor and turbine sections are supported on the second shaft. The gas turbine engine includes a fan. A first compressor section is arranged in an axial flow relationship with the second compressor and the first and second turbines. A geared architecture operatively connects the first shaft and the fan. An inducer operative couples to the gear train.

In a further embodiment of any of the above, the gas turbine engine includes a bypass flow path and a core flow path. The first and second compressor and turbine sections are arranged in the core flow path, and the fan extends into the bypass flow path. The inducer is arranged in the core flow path outside of the bypass flow path and upstream from the first compressor section.

In a further embodiment of any of the above, first and second shafts respectively provide low and high spools. The first compressor and turbine sections are low pressure compressor and turbine sections. The second compressor and turbine sections are high pressure compressor and turbine sections.

In a further embodiment of any of the above, the geared architecture includes first and second gear trains. The first gear train is an epicyclic gear train, and the second gear train is configured to provide a speed reduction.

In a further embodiment of any of the above, the inducer is coupled to the first gear train. The epicyclic gear train is a differential gear train that includes a sun gear. Planetary gears are arranged about and intermesh with the sun gear. A ring gear circumscribes and intermeshes with the planetary gears.

In a further embodiment of any of the above, the inducer is rotationally fixed relative to the ring gear.

In a further embodiment of any of the above, the inducer is rotationally fixed relative to the star gear.

In a further embodiment of any of the above, the inducer is coupled to the second gear train.

In a further embodiment of any of the above, the inducer is rotationally fixed relative to the fan.

In a further embodiment of any of the above, the inducer is configured to rotate at a different rotational speed than the first compressor section.

In a further embodiment of any of the above, the inducer is configured to rotate at a different rotational speed than the fan.

In a further embodiment of any of the above, the inducer is configured to rotate at a different rotational speed than the fan.

In one exemplary embodiment, a gas turbine engine includes first and second shafts rotatable about a common axis. A first turbine section is supported on the first shaft. Second compressor and turbine sections are supported on the second shaft. The gas turbine engine includes a fan. A first compressor section is arranged in an axial flow relationship with the second compressor and the first and second turbines. A geared architecture operatively connects the first shaft and the fan. An inducer is operatively coupled to the gear train. The gas turbine engine includes a bypass flow path and a core flow path. The first and second compressor and turbine sections are arranged in the core flow path, and the fan extends into the bypass flow path. The inducer is arranged in the core flow path outside of the bypass flow path and upstream from the first compressor section. First and second shafts respectively provide low and high spools. The first compressor and turbine sections are low pressure compressor and turbine sections, and the second compressor and turbine sections are high pressure compressor and turbine sections. The geared architecture includes first and second gear trains. The first gear train is an epicyclic gear train, and the second gear train is configured to provide a speed reduction.

In a further embodiment of any of the above, the inducer is coupled to the first gear train. The epicyclic gear train is a differential gear train that includes a sun gear. Planetary gears are arranged about and intermesh with the sun gear. A ring gear circumscribes and intermeshes with the planetary gears.

In a further embodiment of any of the above, the inducer is rotationally fixed relative to the ring gear.

In a further embodiment of any of the above, the inducer is rotationally fixed relative to the star gear.

In a further embodiment of any of the above, the inducer is coupled to the second gear train.

In a further embodiment of any of the above, the inducer is rotationally fixed relative to the fan.

In a further embodiment of any of the above, the inducer is configured to rotate at a different rotational speed than the first compressor section.

In a further embodiment of any of the above, the inducer is configured to rotate at a different rotational speed than the fan.

In a further embodiment of any of the above, the inducer is configured to rotate at a different rotational speed than the fan.

BRIEF DESCRIPTION OF THE DRAWINGS

The disclosure can be further understood by reference to the following detailed description when considered in connection with the accompanying drawings wherein.

DETAILED DESCRIPTION

Figure 1:
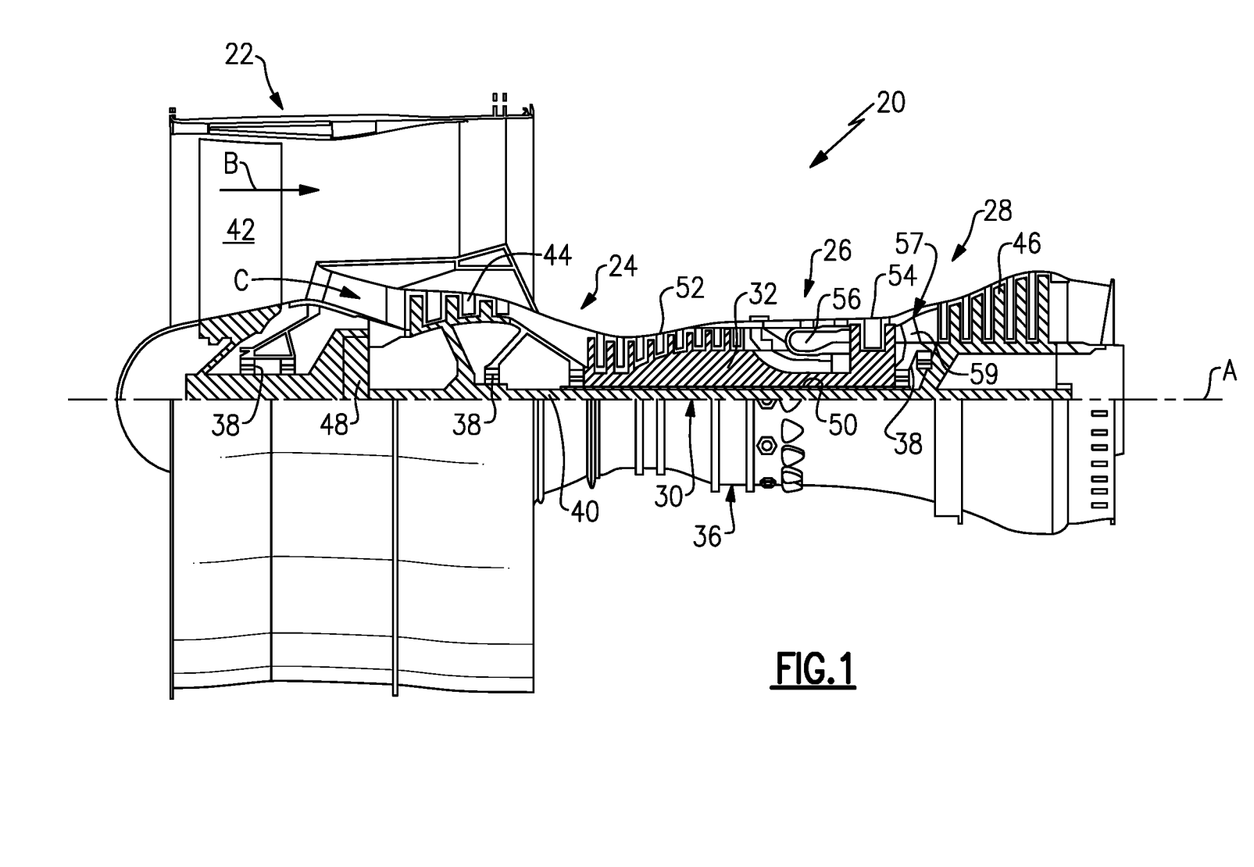
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ deg\ R)/518.7)^{\wedge}0.5]$. The "Low corrected fan tip speed" as disclosed herein according to one non-limiting embodiment is less than about 1150 ft/second.

Figure 2:
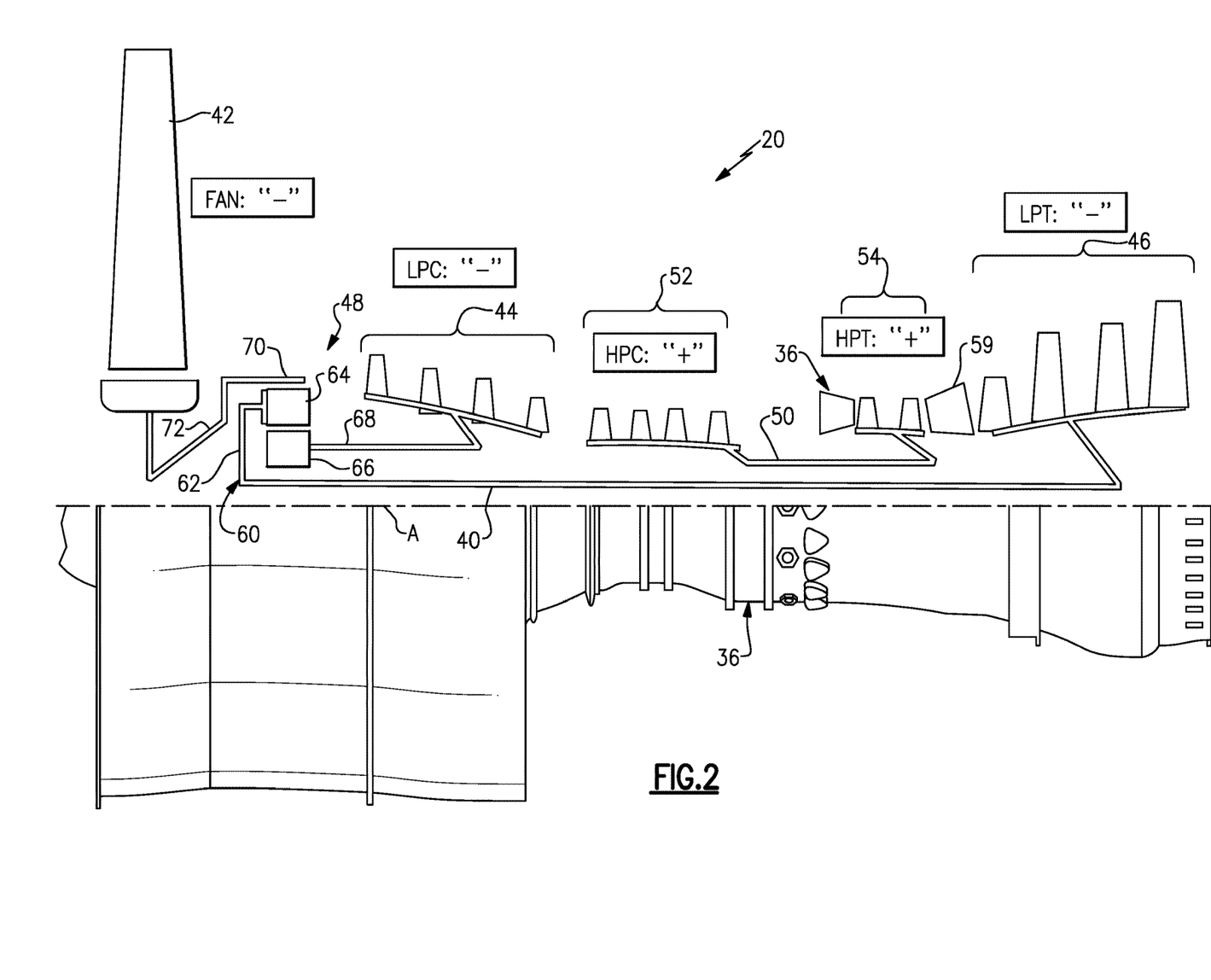
FIG. 2 is a schematic view of a geared architecture embodiment for the engine shown in FIG. 1.

An example geared architecture 48 for the engine 20 is shown in FIG. 2. Generally, the engine static structure 36 supports the inner and outer shafts 40, 50 for rotation about the axis A. The outer shaft 50 supports the high pressure compressor section 52 and the high pressure turbine section 54, which is arranged upstream from the mid turbine frame 59.

The inner shaft 40 is coupled to the geared architecture 48, which is an epicyclic gear train 60 configured in a differential arrangement. The gear train 60 includes planetary gears 64 supported by a carrier 62, which is connected to the inner shaft 40 that supports the low pressure turbine 46. A sun gear 66 is centrally arranged relative to and intermeshes with the planetary gears 64. A ring gear 70 circumscribes and intermeshes with the planetary gears 64. In the example, a fan shaft 72, which is connected to the fan 42, is rotationally fixed relative to the ring gear 70. The low pressure compressor 44 is supported by a low pressure compressor rotor 68, which is connected to the sun gear 66 in the example.

The carrier 62 is rotationally driven by the low pressure turbine 46 through the inner shaft 40. The planetary gears 64 provide the differential input to the fan shaft 72 and low pressure compressor rotor 68 based upon the geometry ratio, which is discussed in detail in connection with FIGS. 9A-10.

Figure 3:
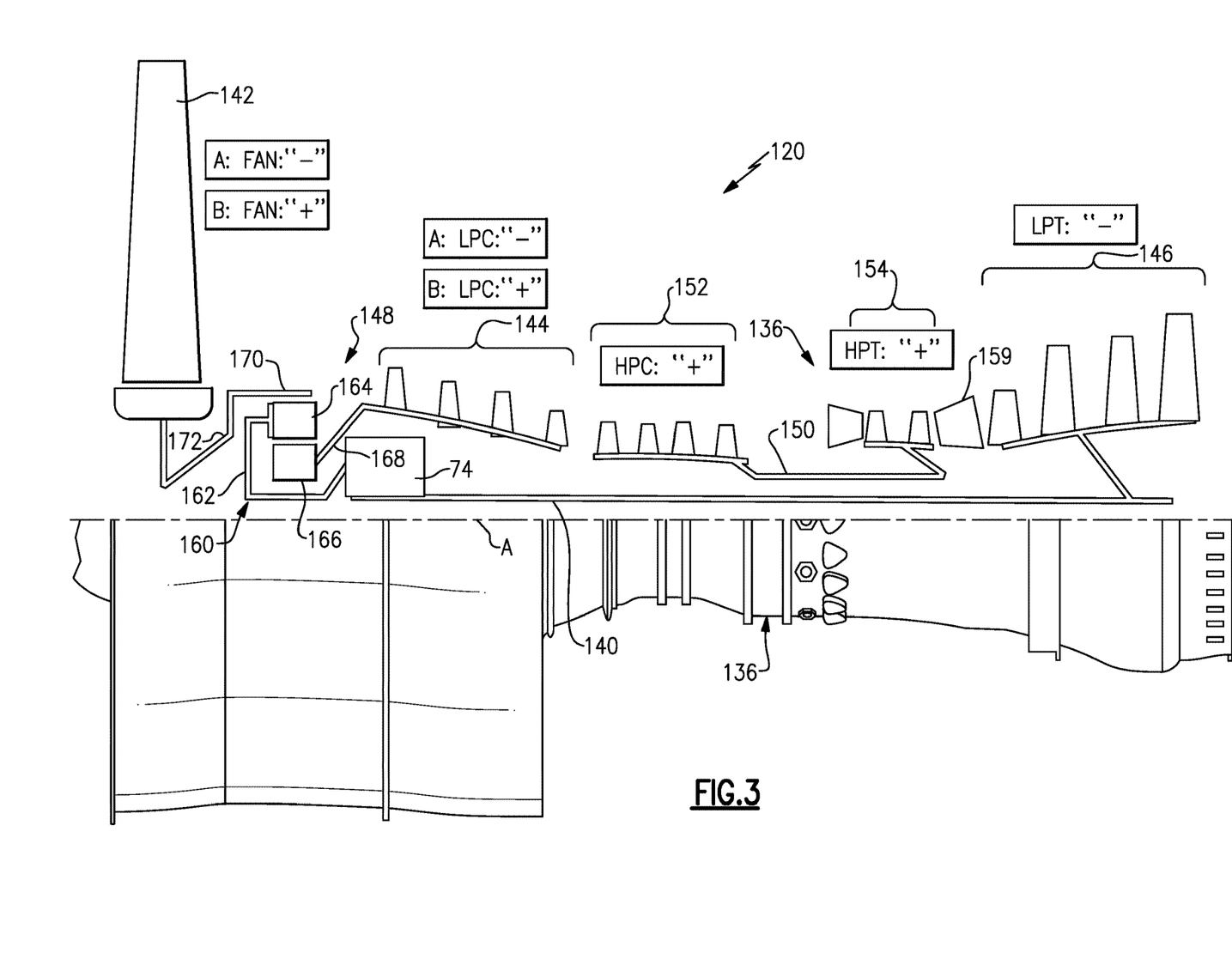
FIG. 3 is a schematic view of another geared architecture embodiment.

Another example geared architecture 148 for the engine 120 is shown in FIG. 3. The engine static structure 136 supports the inner and outer shafts 140, 150 for rotation about the axis A. The outer shaft 150 supports the high pressure compressor section 152 and the high pressure turbine section 154, which is arranged upstream from the mid turbine frame 159.

The inner shaft 140 is coupled to the geared architecture 148, which is an epicyclic gear train 160 configured in a differential arrangement. The gear train 160 includes planetary gears 164 supported by a carrier 162, which is connected to the inner shaft 140 that supports the low pressure turbine 146. A sun gear 166 is centrally arranged relative to and intermeshes with the planetary gears 164. A ring gear 170 circumscribes and intermeshes with the planetary gears 164. In the example, a fan shaft 172, which is connected to the fan 142, is rotationally fixed relative to the ring gear 170. The low pressure compressor 144 is supported by a low pressure compressor rotor 168, which is connected to the sun gear 166 in the example.

The carrier 162 is rotationally driven by the low pressure turbine 146 through the inner shaft 140. The planetary gears 164 provide the differential input to the fan shaft 172 and low pressure compressor rotor 168 based upon the geometry ratio. The geared architecture 148 includes an additional speed change device 74 interconnecting the inner shaft 140 and the gear train 160. Higher low pressure turbine section rotational speeds are attainable with the additional speed change device 74, enabling the use of fewer turbine stages in the low pressure turbine section. The speed change device 74 may be a geared arrangement and/or a hydraulic arrangement for reducing the rotational speed from the low pressure turbine section 146 to the fan 142 and low pressure compressor section 144.

Figure 4:
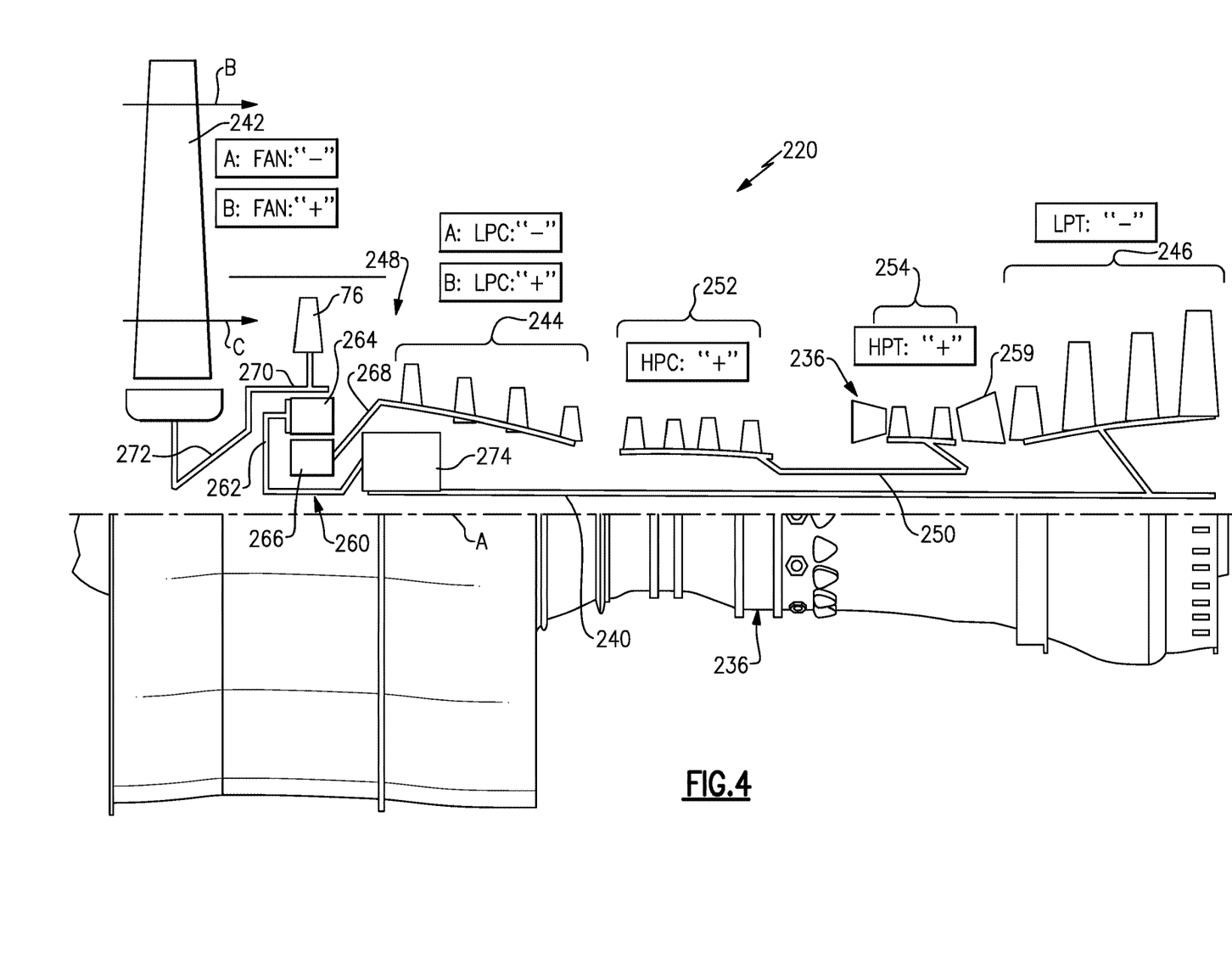
FIG. 4 is a schematic view of a geared architecture embodiment with an inducer.

Another example geared architecture 248 for the engine 220 is shown in FIG. 4. The engine static structure 236 supports the inner and outer shafts 240, 250 for rotation about the axis A. The outer shaft 250 supports the high pressure compressor section 252 and the high pressure turbine section 254, which is arranged upstream from the mid turbine frame 259.

The inner shaft 240 is coupled to the geared architecture 248, which is an epicyclic gear train 260 configured in a differential arrangement. The gear train 260 includes planetary gears 264 supported by a carrier 262, which is connected to the inner shaft 240 that supports the low pressure turbine 246. A sun gear 266 is centrally arranged relative to and intermeshes with the planetary gears 264. A ring gear 270 circumscribes and intermeshes with the planetary gears 264. In the example, a fan shaft 272, which is connected to the fan 242, is rotationally fixed relative to the ring gear 270. The low pressure compressor 244 is supported by a low pressure compressor rotor 268, which is connected to the sun gear 266 in the example.

The carrier 262 is rotationally driven by the low pressure turbine 246 through the inner shaft 240. The planetary gears 264 provide the differential input to the fan shaft 272 and low pressure compressor rotor 268 based upon the geometry ratio. The geared architecture 248 includes an additional speed change device 274 interconnecting the inner shaft 240 and the gear train 260.

An inducer 76 is fixed for rotation relative to the ring gear 270. The inducer 76 is arranged in the core flow path C to provide some initial compression to the air before entering the low pressure compressor section 244. The inducer 76 rotates at the same rotational speed as the fan 242 and provides some additional thrust, which is useful in hot weather, for example, where engine thrust is reduced.

Figure 5:
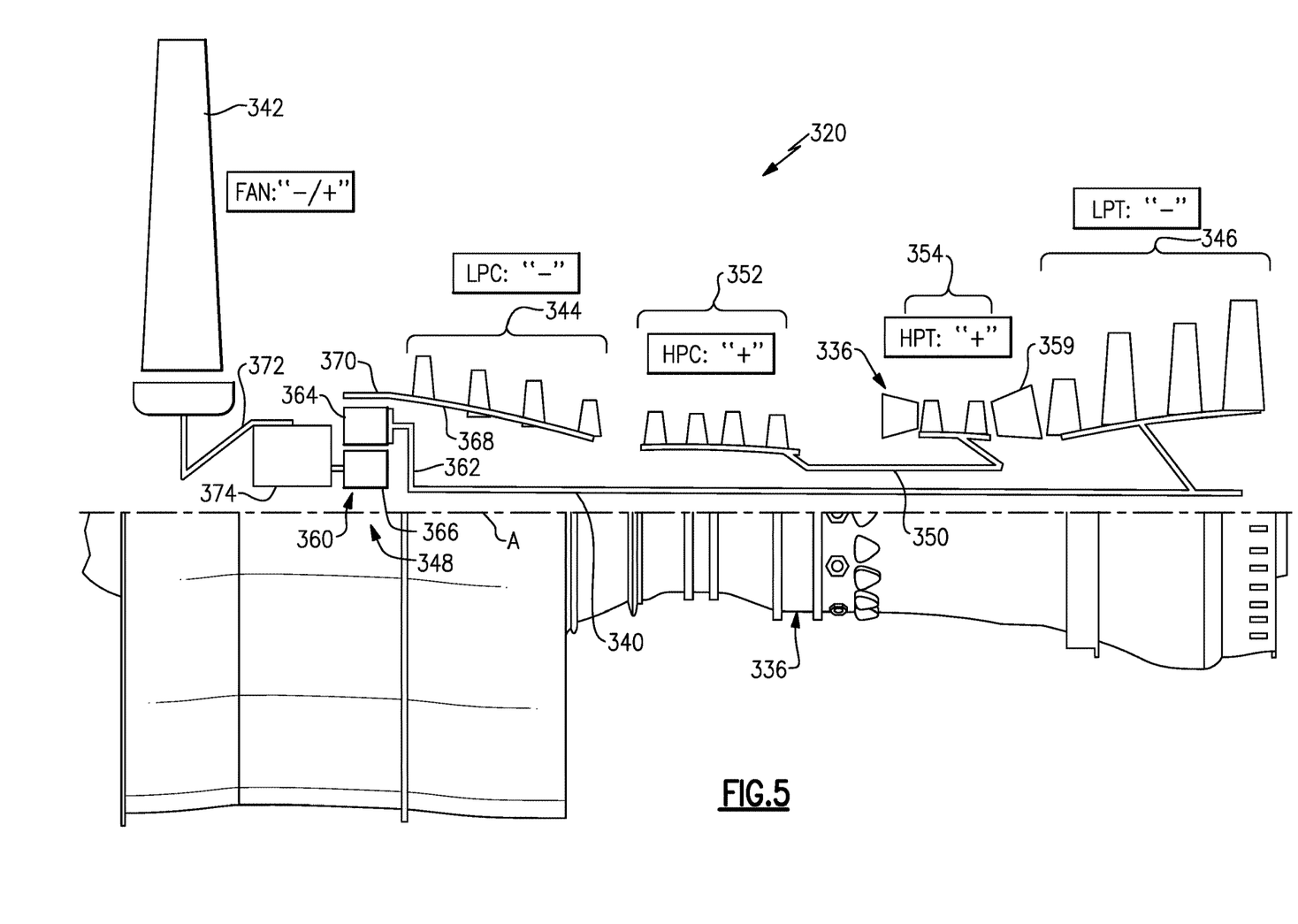
FIG. 5 is a schematic view of yet another geared architecture embodiment.

Another example geared architecture 348 for the engine 320 is shown in FIG. 5. The engine static structure 336 supports the inner and outer shafts 340, 350 for rotation about the axis A. The outer shaft 350 supports the high pressure compressor section 352 and the high pressure turbine section 354, which is arranged upstream from the mid turbine frame 359.

The inner shaft 340 is coupled to the geared architecture 348, which is an epicyclic gear train 360 configured in a differential arrangement. The gear train 360 includes planetary gears 364 supported by a carrier 362, which is connected to the inner shaft 340 that supports the low pressure turbine 346. A sun gear 366 is centrally arranged relative to and intermeshes with the planetary gears 364. A ring gear 370 circumscribes and intermeshes with the planetary gears 364. In the example, a fan shaft 372 is connected to the fan 342. The low pressure compressor 344 is supported by a low pressure compressor rotor 368, which is rotationally fixed relative to the ring gear 370 in the example.

The carrier 362 is rotationally driven by the low pressure turbine 346 through the inner shaft 340. The planetary gears 364 provide the differential input to the fan shaft 372 and low pressure compressor rotor 368 based upon the geometry ratio. The geared architecture 348 includes an additional speed change device 374 interconnecting the inner shaft 340 and the gear train 360. The speed change device 374 receives rotational input from the sun gear 366 and couples the fan shaft 372 to the gear train 360, which enables slower fan speeds.

Figure 6:
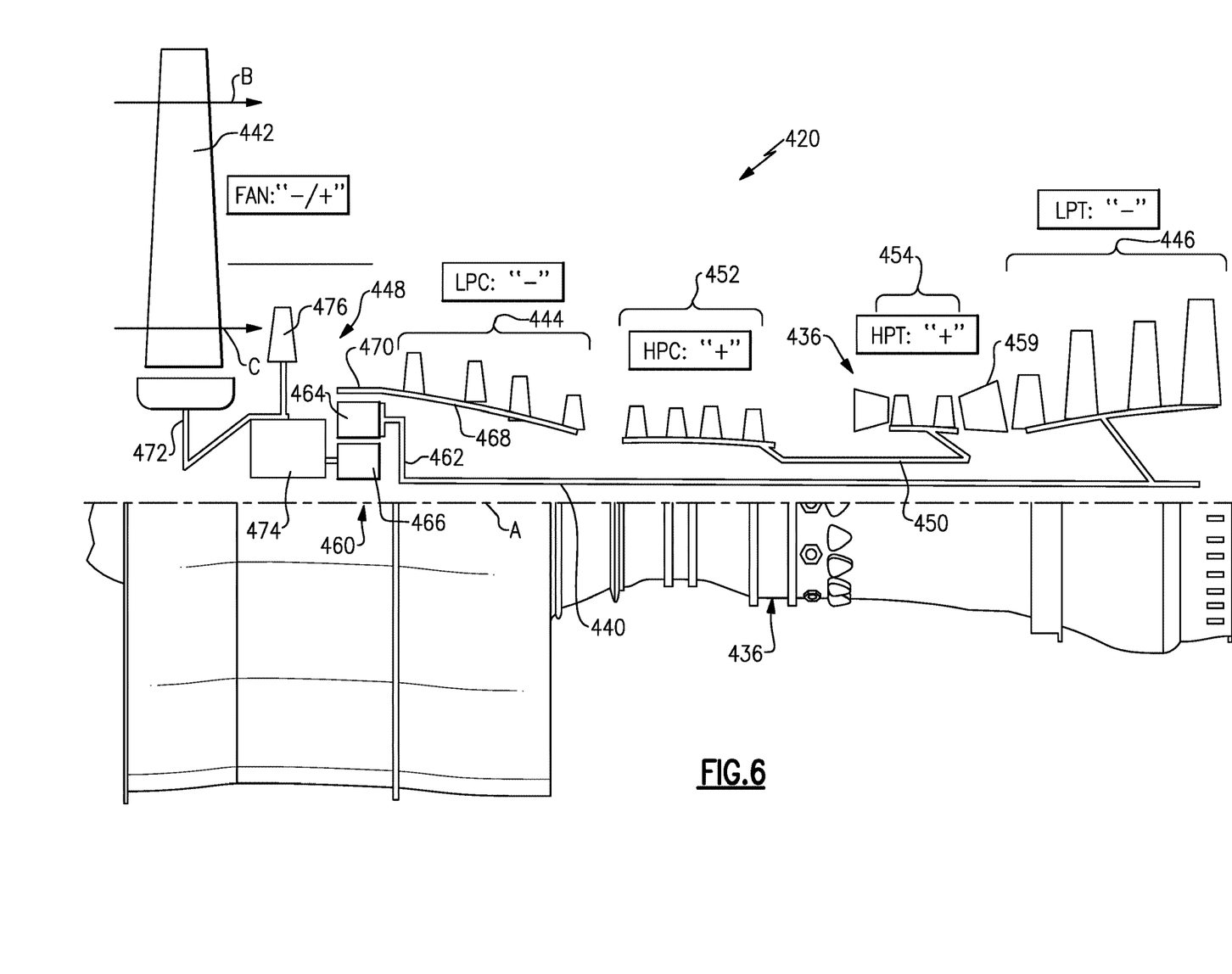
FIG. 6 is a schematic view of another geared architecture embodiment with an inducer.

Another example geared architecture 448 for the engine 420 is shown in FIG. 6. The engine static structure 436 supports the inner and outer shafts 440, 450 for rotation about the axis A. The outer shaft 450 supports the high pressure compressor section 452 and the high pressure turbine section 454, which is arranged upstream from the mid turbine frame 459.

The inner shaft 440 is coupled to the geared architecture 448, which is an epicyclic gear train 460 configured in a differential arrangement. The gear train 460 includes planetary gears 464 supported by a carrier 462, which is connected to the inner shaft 440 that supports the low pressure turbine 446. A sun gear 466 is centrally arranged relative to and intermeshes with the planetary gears 464. A ring gear 470 circumscribes and intermeshes with the planetary gears 464. In the example, a fan shaft 472 is connected to the fan 442. The low pressure compressor 444 is supported by a low pressure compressor rotor 468, which is rotationally fixed relative to the ring gear 470 in the example.

The carrier 462 is rotationally driven by the low pressure compressor 446 through the inner shaft 440. The planetary gears 464 provide the differential input to the fan shaft 472 and low pressure compressor rotor 468 based upon the geometry ratio. The geared architecture 448 includes an additional speed change device 474 interconnecting the inner shaft 440 and the gear train 460. The speed change device 474 receives rotational input from the sun gear 466 and couples the fan shaft 472 to the gear train 460, which enables slower fan speeds.

The inducer 476 is fixed for rotation relative to the fan shaft 472. The inducer 476 is arranged in the core flow path C to provide some initial compression to the air before entering the low pressure compressor section 444. The inducer 476 rotates at the same rotational speed as the fan 442.

Figure 7:
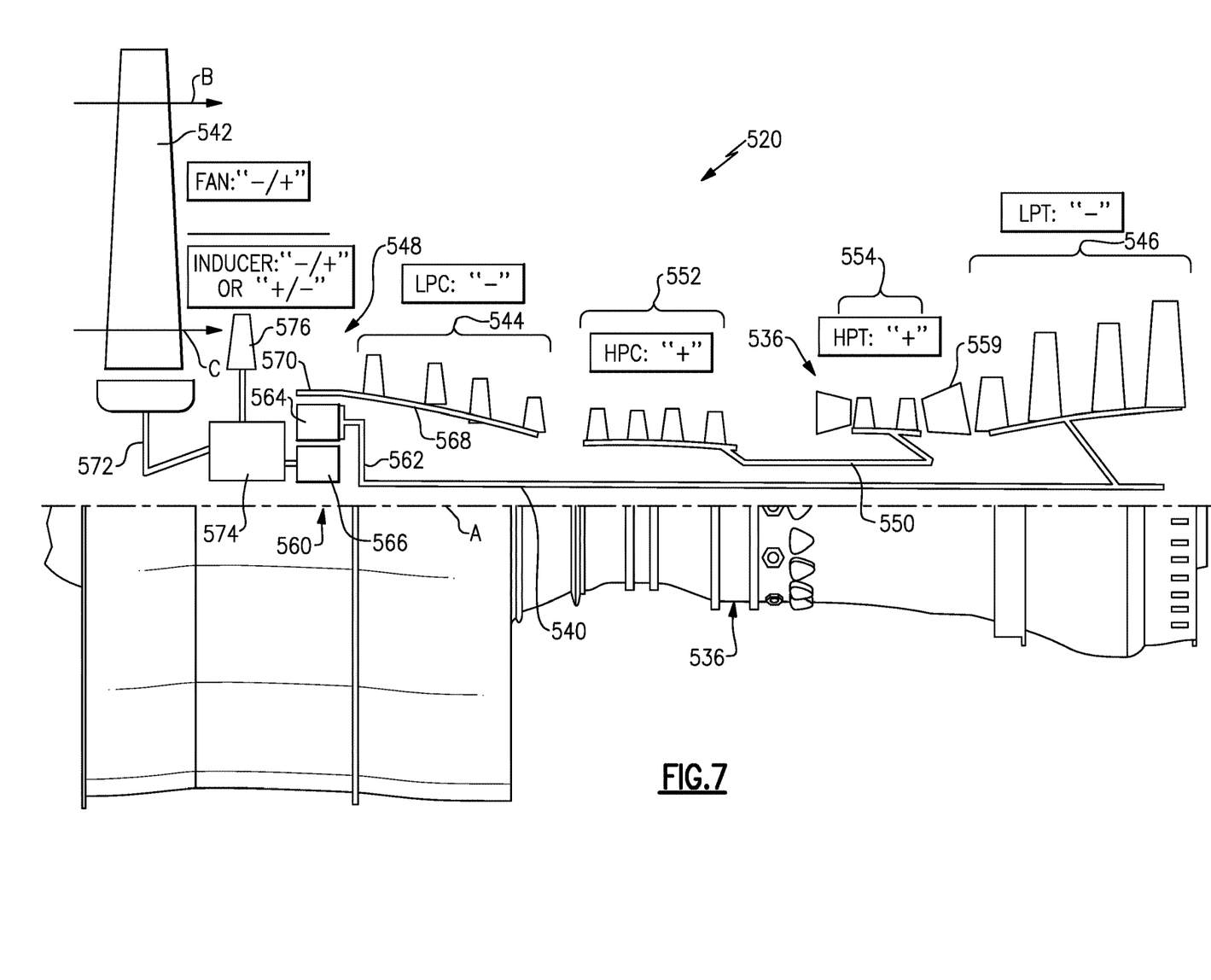
FIG. 7 is a schematic view of yet another geared architecture embodiment with an inducer.

Another example geared architecture 548 for the engine 520 is shown in FIG. 7. The engine static structure 536 supports the inner and outer shafts 540, 550 for rotation about the axis A. The outer shaft 550 supports the high pressure compressor section 552 and the high pressure turbine section 554, which is arranged upstream from the mid turbine frame 559.

The inner shaft 540 is coupled to the geared architecture 548, which is an epicyclic gear train 560 configured in a differential arrangement. The gear train 560 includes planetary gears 564 supported by a carrier 562, which is connected to the inner shaft 540 that supports the low pressure turbine 546. A sun gear 566 is centrally arranged relative to and intermeshes with the planetary gears 564. A ring gear 570 circumscribes and intermeshes with the planetary gears 564. In the example, a fan shaft 572 is connected to the fan 542. The low pressure compressor 544 is supported by a low pressure compressor rotor 568, which is rotationally fixed relative to the ring gear 570 in the example.

The carrier 562 is rotationally driven by the low pressure turbine 546 through the inner shaft 540. The planetary gears 564 provide the differential input to the fan shaft 572 and low pressure compressor rotor 568 based upon the geometry ratio. The geared architecture 548 includes an additional speed change device 574 interconnecting the inner shaft 540 and the gear train 560. The speed change device 574 receives rotational input from the sun gear 566 and couples the fan shaft 572 to the gear train 560, which enables slower fan speeds.

The inducer 576 is fixed for rotation relative to the fan shaft 572. The inducer 576 is arranged in the core flow path C to provide some initial compression to the air before entering the low pressure compressor section 544. In one example, the sun gear 566 rotates at the same speed as one of the fan shaft 572 and the inducer 576, and the other of the fan shaft 572 and the inducer 576 rotate at a different speed than the sun gear 566. In another example, the inducer 576, sun gear 566 and fan shaft 572 rotate at different rotational speeds than one another through the speed change device 574, which is another epicyclic gear train, for example.

Figure 8:
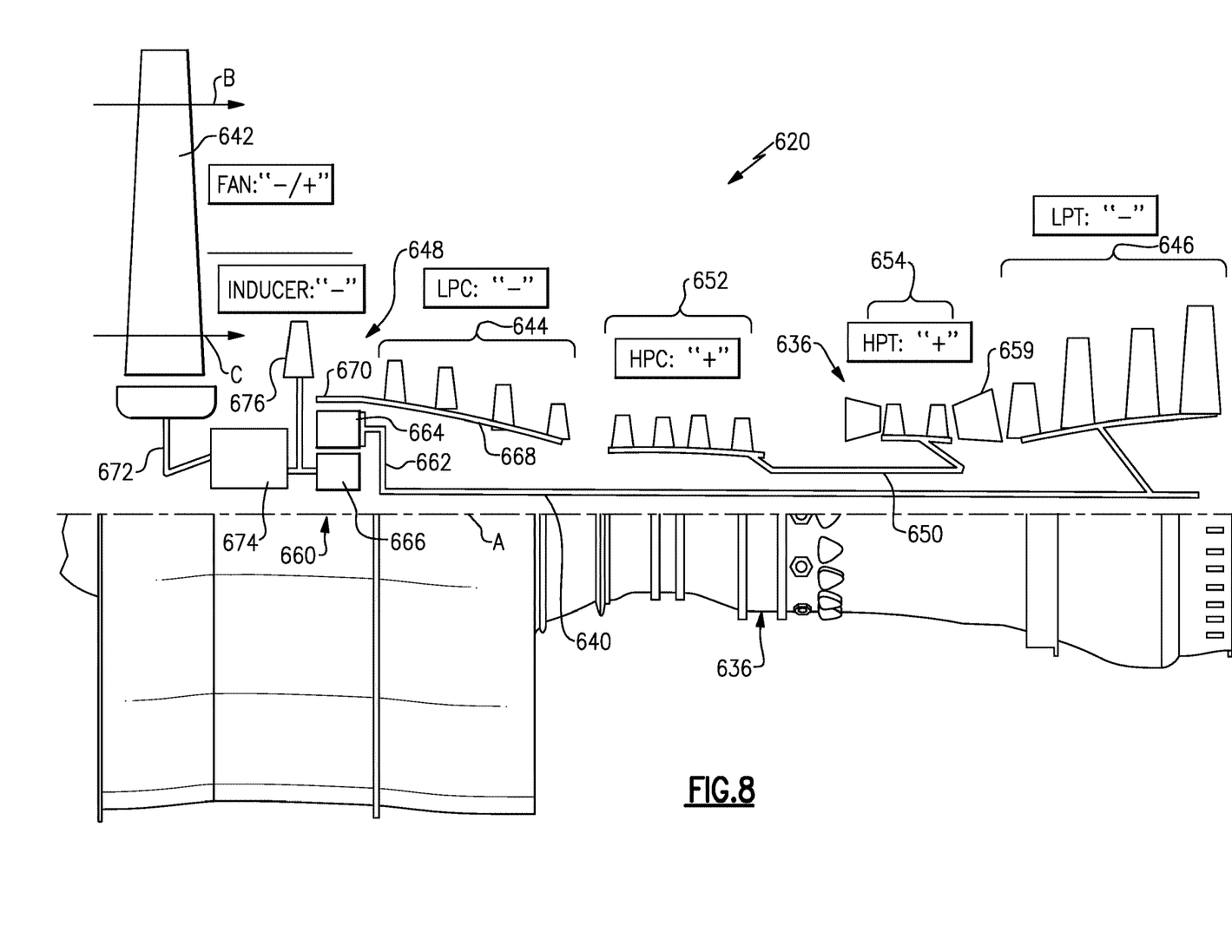
FIG. 8 is a schematic view of still another geared architecture embodiment with an inducer.

Another example geared architecture 648 for the engine 620 is shown in FIG. 8. The engine static structure 636 supports the inner and outer shafts 640, 650 for rotation about the axis A. The outer shaft 650 supports the high pressure compressor section 652 and the high pressure turbine section 654, which is arranged upstream from the mid turbine frame 659.

The inner shaft 640 is coupled to the geared architecture 648, which is an epicyclic gear train 660 configured in a differential arrangement. The gear train 660 includes planetary gears 664 supported by a carrier 662, which is connected to the inner shaft 640 that supports the low pressure turbine 646. A sun gear 666 is centrally arranged relative to and intermeshes with the planetary gears 664. A ring gear 670 circumscribes and intermeshes with the planetary gears 664. In the example, a fan shaft 672 is connected to the fan 642. The low pressure compressor 644 is supported by a low pressure compressor rotor 668, which is rotationally fixed relative to the ring gear 670 in the example.

The carrier 662 is rotationally driven by the low pressure turbine 646 through the inner shaft 640. The planetary gears 664 provide the differential input to the fan shaft 672 and low pressure compressor rotor 668 based upon the geometry ratio. The geared architecture 648 includes an additional speed change device 674 interconnecting the inner shaft 640 and the gear train 660. The speed change device 674 receives rotational input from the sun gear 666 and couples the fan shaft 672 to the gear train 660, which enables slower fan speeds.

The inducer 676 is arranged in the core flow path C to provide some initial compression to the air before entering the low pressure compressor section 644. The inducer 676 is fixed to the sun gear 666 for rotation at the same rotational speed.

In the arrangements shown in FIGS. 2-8, the relative rotational directions are shown for each of the fan, low pressure compressor section, high pressure compressor section, high pressure turbine section, low pressure turbine section and inducer. The geared architectures may be configured in a manner to provide the desired rotational direction for a given engine design.

The example geared architectures enable large fan diameters relative to turbine diameters, moderate low pressure turbine to fan speed ratios, moderate low pressure compressor to low pressure turbine speed ratios, high low pressure compressor to fan speed ratios and compact turbine section volumes. The low pressure turbine section may include between three and six stages, for example.

The rotational speeds of the sun gear, ring gear and carrier are determined by the geometry ratio of the differential gear train. The interrelationship of these components can be expressed using the following equation:

$$\frac{X_{carrier}}{X_{ring}} = \frac{GR}{1+GR}, \text{ where} \qquad \text{(Equation 1)}$$

$X_{carrier}$ is the nomograph distance of the planetary rotational axis from the sun gear axis,
$X_{ring}$ is the nomograph radius of the ring gear, and
GR is the geometry ratio.
Thus, for a geometry ratio of 3.0, $$\frac{X_{carrier}}{X_{ring}} = 0.75.$$

Figure 9A:
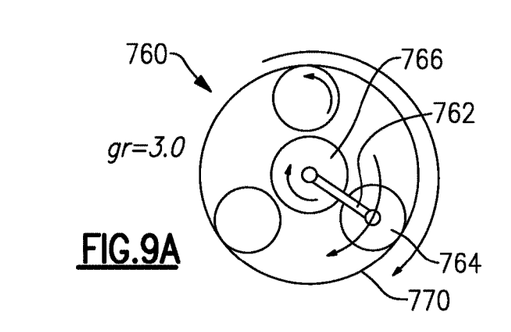
FIG. 9A is a schematic view of an epicyclic gear train having a first example geometry ratio.
Figure 9B:
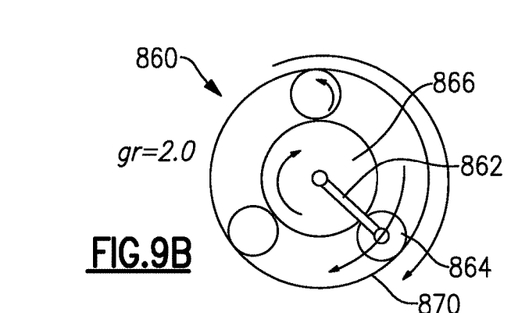
FIG. 9B is a schematic view of an epicyclic gear train having a second example geometry ratio.
Figure 9C:
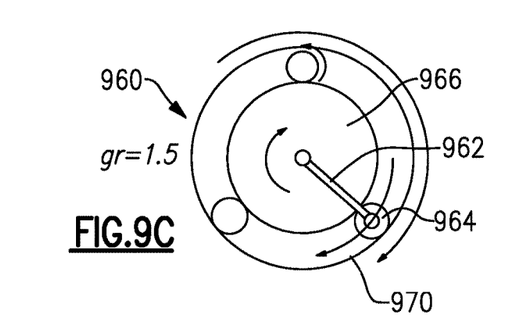
FIG. 9C is a schematic view of an epicyclic gear train having a third example geometry ratio.

The relative sizes amongst the sun gear, planetary gears and ring gear for several different geometry ratios are schematically depicted in FIGS. 9A-9C. Referring to FIG. 9A, the epicyclic gear train 760 includes a sun gear 766, planetary 764, carrier 762 and ring gear 770 that are sized to provide a geometry ratio of 3.0. Referring to FIG. 9B, the epicyclic gear train 860 includes a sun gear 866, planetary 864, carrier 862 and ring gear 870 that are sized to provide a geometry ratio of 2.0. Referring to FIG. 9C, the epicyclic gear train 960 includes a sun gear 966, planetary 964, carrier 962 and ring gear 970 that are sized to provide a geometry ratio of 1.5. In the examples, the ring gear radius remains constant.

Figure 10:
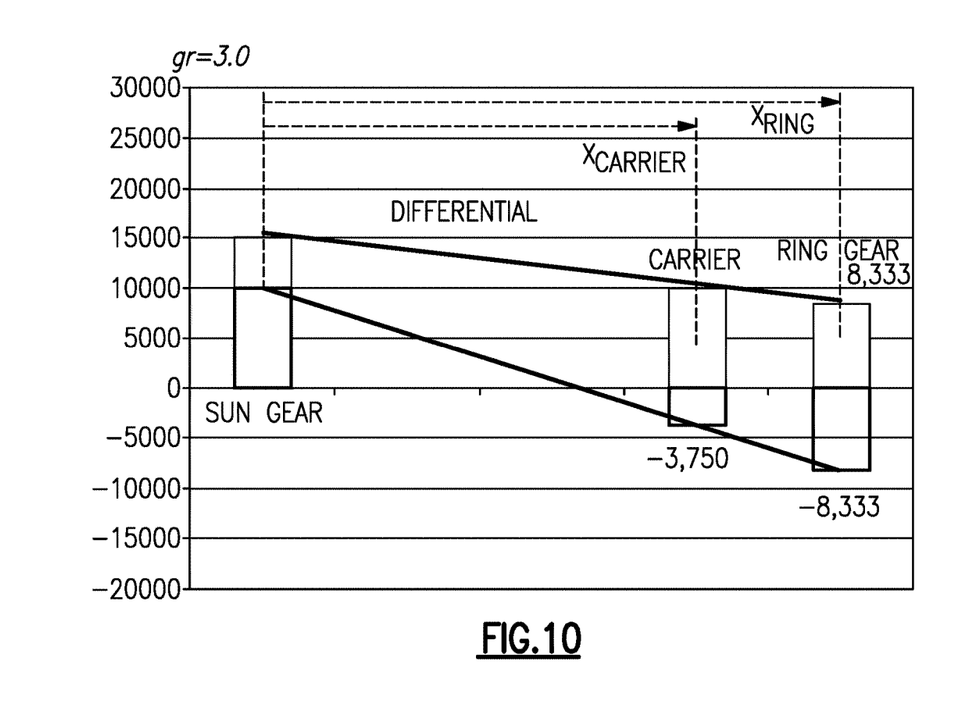
FIG. 10 is a nomograph depicting the interrelationship of speeds of epicyclic gear train components for a given geometry ratio.

FIG. 10 graphically depicts effects of the geometry ratio on the rotational speeds and directions of the sun and ring gears and the carrier. The upper, lighter shaded bars relate to FIG. 9A-9C. Assuming a rotational input from the low pressure turbine to the carrier of 10,000 RPM, the sun gear would be driven at 15,000 RPM and the ring gear would be driven at 8,333 RPM for a geometry ratio of 3.0. In an arrangement in which the fan is coupled to the ring gear and the sun gear is coupled to the low pressure compressor, like the arrangement shown in FIG. 2, the following speed ratios would be provided: LPT:fan=1.2, LPC:LPT=1.5, and LPC:fan=1.8.

Figure 11A:
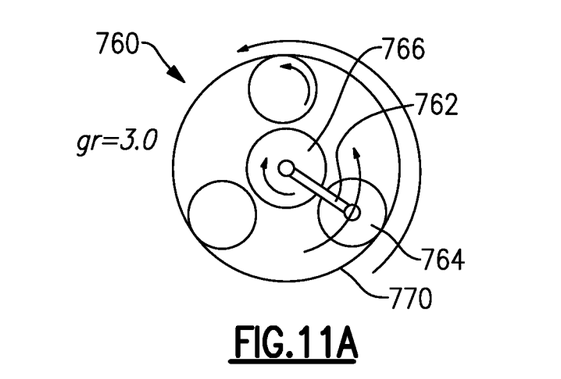
FIG. 11A is a schematic view of an epicyclic gear train having the first geometry ratio with a carrier rotating in the opposite direction to that shown in FIG. 9A.
Figure 11B:
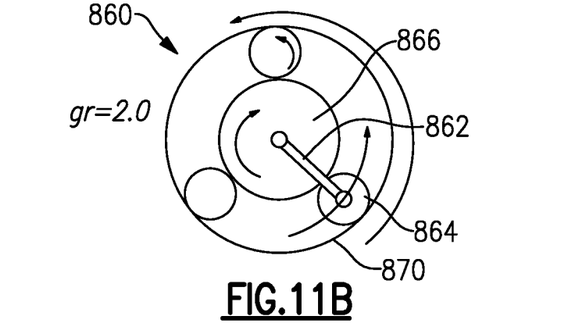
FIG. 11B is a schematic view of an epicyclic gear train having the second geometry ratio with a carrier rotating in the opposite direction to that shown in FIG. 9B.
Figure 11C:
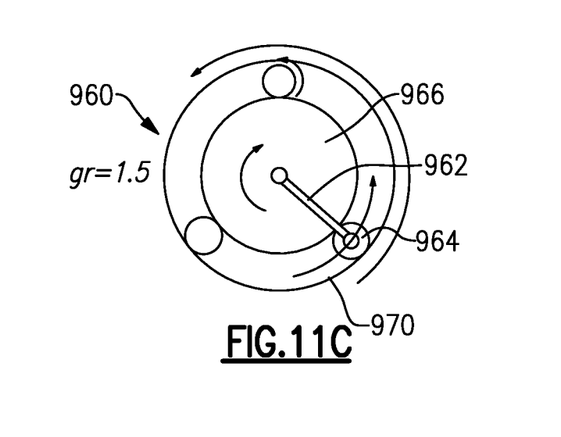
FIG. 11C is a schematic view of an epicyclic gear train having the third geometry ratio with a carrier rotating in the opposite direction to that shown in FIG. 9C.

The lower, darker shaded bars relate to FIGS. 11A-11C. The carrier and ring gear rotate in the opposite direction than depicted in FIG. 9A-9C.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   first and second shafts rotatable about a common axis and not mechanically, rotationally coupled from to one another, the first and second shafts respectively provide low and high spools;
   multiple turbine sections including first and second turbine sections respectively mounted on the first and second shafts, first and second compressor sections respectively driven through the first and second shafts, the first compressor and turbine sections are low pressure compressor and turbine sections, and the second compressor and turbine sections are high pressure compressor and turbine sections;
   a fan arranged fluidly upstream from a core nacelle;
   a gear train and a speed change device interconnected to one another and coupling the first shaft to the fan such that the fan is driven through the first shaft by both the gear train and the speed change device, wherein the gear train is a differential gear train that includes a sun gear, planetary gears arranged about and intermeshing with the sun gear, and a ring gear circumscribing and intermeshing with the planetary gears; and
   an inducer coupled to the speed change device; wherein the fan shaft and the inducer are rotationally fixed to the ring gear.

2. The gas turbine engine of claim 1, wherein the speed change device is coupled between the low pressure turbine section and the gear train.

3. The gas turbine engine of claim 1, wherein the speed change device is mechanically downstream from the gear train.

4. The gas turbine engine of claim 1, wherein the speed change device is arranged between the first shaft and the gear train.

5. The gas turbine engine of claim 4, wherein the planetary gears are supported by a carrier, and the carrier is configured to receive rotational input from one of the first shaft and the speed change device.

6. The gas turbine engine of claim 1, wherein the first compressor section is coupled to the gear train.

7. The gas turbine engine of claim 1, wherein the low pressure compressor is supported by a low pressure compressor rotor, which is connected to the sun gear.

8. The gas turbine engine of claim 1, wherein the carrier is driven by the low pressure compressor.

9. The gas turbine engine of claim 1, having a bypass ratio greater than 10.

10. The gas turbine engine of claim 1, wherein the gear train has a gear reduction ratio of greater than about 2.3 and the low pressure turbine has a pressure ratio that is greater than about 5.

11. A gas turbine engine comprising:
    first and second shafts rotatable about a common axis;
    a first turbine section supported on the first shaft;
    second compressor and turbine sections supported on the second shaft;
    a fan;
    a first compressor section arranged in an axial flow relationship with the second compressor and the first and second turbine sections;
    a geared architecture operatively connecting the first shaft and the fan, wherein the geared architecture includes first and second gear trains, the first gear train an epicyclic gear train, and the second gear train configured to provide a speed reduction; and
    the epicyclic gear train is a differential gear train that includes a sun gear, planetary gears arranged about and intermeshing with the sun gear, and a ring gear circumscribing and intermeshing with the planetary gears, wherein the first compressor section is supported by a first compressor rotor, which is rotationally fixed relative to the ring gear.

12. The gas turbine engine of claim 11, wherein an inducer is upstream from the first compressor section.

13. The gas turbine engine of claim 12, wherein the fan is driven by a fan shaft and the inducer is fixed for rotation relative to the fan shaft.

14. The gas turbine engine of claim 11, wherein a carrier is rotationally driven by the low pressure compressor through the inner shaft.

15. The gas turbine engine of claim 11, wherein the first compressor section is a low pressure compressor section.

16. The gas turbine engine of claim 15, wherein an inducer is upstream from the low pressure compressor section.

17. The gas turbine engine of claim 15, wherein the planetary gears provide differential input to the fan shaft and the low pressure compressor.

18. The gas turbine engine of claim 11, having a bypass ratio greater than about 10, and wherein the low pressure turbine has a pressure ratio that is greater than about 5.

19. The gas turbine engine of claim 11, having a fan pressure ratio that is less than about 1.45.

20. The gas turbine engine of claim 19, wherein the fan has a low corrected fan tip speed that is less than about 1150 feet per second.

* * * * *